United States Patent
Poonamalli et al.

(10) Patent No.: US 9,110,754 B2
(45) Date of Patent: Aug. 18, 2015

(54) COMPUTING DEVICE UPDATE CONTROL

(75) Inventors: Rajiv N. Poonamalli, Redmond, WA (US); Ulattil Shaji, Sammamish, WA (US); Sharad Goel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 13/485,459

(22) Filed: May 31, 2012

(65) Prior Publication Data
US 2013/0326493 A1  Dec. 5, 2013

(51) Int. Cl.
G06F 9/44 (2006.01)
G06F 9/445 (2006.01)

(52) U.S. Cl.
CPC ........................................ G06F 8/65 (2013.01)

(58) Field of Classification Search
None
See application file for complete search history.

(56) References Cited

U.S. PATENT DOCUMENTS

| | | | |
|---|---|---|---|
| 6,282,709 B1 | 8/2001 | Reha et al. | |
| 6,802,586 B2 | 10/2004 | Forman | |
| 7,062,764 B2 | 6/2006 | Cohen et al. | |
| 7,251,812 B1 * | 7/2007 | Jhanwar et al. | 717/171 |
| 7,793,284 B2 * | 9/2010 | Mason et al. | 717/174 |
| 2008/0005732 A1 | 1/2008 | Coon | |
| 2008/0043000 A1 * | 2/2008 | Currid et al. | 345/179 |
| 2009/0210868 A1 | 8/2009 | Parthasarathy | |

OTHER PUBLICATIONS

"Specifying Hardware IDs for a Computer", Retrieved from: <http://msdn.microsoft.com/en-us/library/windows/hardware/ff552325(v=vs.85).aspx> on Jun. 1, 2012,(May 8, 2012),5 pages.
"Understanding Device Drivers and Deployment", Retrieved from: <http://technet.microsoft.com/en-us/library/dd744517(v=ws.10).aspx> on May 29, 2012,(Oct. 22, 2009),4 pages.
Scalisi, Michael "How to use Windows Server Update Service", Retrieved from: <http://www.computerworlduk.com/how-to/operating-systems/2832/how-to-use-windows-server-update-service/> on Jun. 1, 2012,(Dec. 21, 2009),1 pages.

* cited by examiner

*Primary Examiner* — Don Wong
*Assistant Examiner* — Deric Ortiz
(74) *Attorney, Agent, or Firm* — Bryan Webster; Kate Drakos; Micky Minhas

(57) ABSTRACT

Techniques for computing device update configuration are described. In implementations, an update service is employed to manage update groups for various types and/or classifications of computing devices. An update group can specify particular update statuses for functionalities of a computing device, such as device driver updates, software updates, firmware updates, and so forth. In at least some implementations, a computing device can be assigned to an update group based on attributes of the computing device, such as an identifier of a manufacturer for the computing device, a make identifier for the computing device, a model identifier, and so forth. Update information associated with the update group can be synchronized with the computing device.

20 Claims, 7 Drawing Sheets

COMPUTING DEVICE UPDATE CONTROL

BACKGROUND

Computing devices typically include various functionalities that can be updated from time to time. For example, a component device of a computing device (e.g., a graphics card, a data storage device, an input device, and so forth) can be associated with a device driver that enables the component device to function in the context of the computing device. A manufacturer or other entity associated with the component device can issue an update to the device driver, such as to fix a software bug, solve a compatibility issue, enhance functionality of the component device, and so on. The update can be installed on the computing device to replace or augment a previous version of the device driver.

Similarly, a software application installed on a computing device can be updated. For example, an operating system developer can issue an update to the operating system, such as to fix a security vulnerability, fix a bug, and so forth. Determining which updates to provide to a computing device involves a number of considerations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for computing device update configuration are described. In implementations, an update service is employed to manage update groups for various types and/or classifications of computing devices. An update group can specify particular update statuses for functionalities of a computing device, such as device driver updates, software updates, firmware updates, and so forth. An update group can also specify particular updates that are not to be applied to particular types of computing devices. Thus, different update groups can be utilized to indicate update statuses for different computing devices.

In at least some implementations, a computing device can query an update service for available updates. As part of the query, the computing device can provide profile information for the computing device, such as an identifier of a manufacturer for the computing device, a make identifier for the computing device, a model identifier, and so forth. The update service can inspect the profile information, and can match the profile information to a corresponding update group. In at least some implementations, a computing device can be matched to an update group dynamically, e.g., each time the computing device queries for updates.

Update information associated with the corresponding update group can be synchronized with the computing device. For instance, updates associated with the corresponding update group can be propagated to the computing device. Further, in at least some implementations, updates not associated with the corresponding update group are not propagated to the computing device. For example, an update can be excluded from an update group for various reasons, as discussed in more detail below.

For instance, consider a scenario where a computing device manufacturer determines that a particular update may interfere with functionality of computing devices that correspond to a particular computing device profile. The update, for example, may cause a software conflict in the computing device that causes undesirable functioning of the computing device. Such undesirable functioning can include a software crash (e.g., an operating system crash), slowing of data processing, component device malfunctioning, and so on. Thus, the computing device manufacturer can specify that the particular update is not to be propagated to computing devices that correspond to the particular profile. For example, update information for an update group associated with the device profile can indicate that the particular update is not to be installed on computing devices within the update group. This can enable manufacturers that detect problems and/or potential problems with updates to prevent the updates from being installed on computing devices that may be affected.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
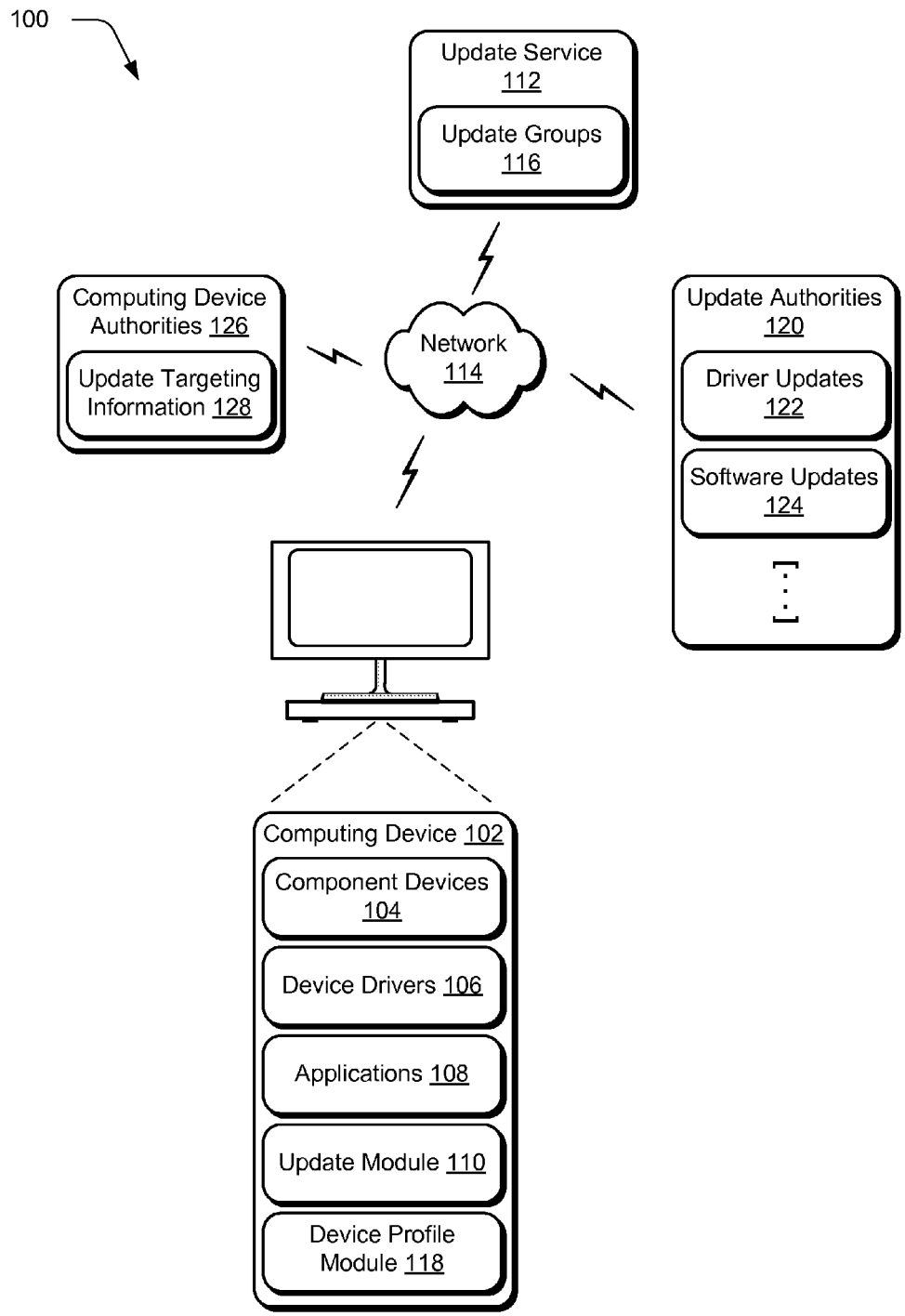
FIG. 1 is an illustration of an environment in an example implementation that is operable to employ techniques discussed herein.

Techniques for computing device update configuration are described. In implementations, an update service is employed to manage update groups for various types and/or classifications of computing devices. An update group can specify particular update statuses for functionalities of a computing device, such as device driver updates, software updates, firmware updates, and so forth. An update group can also specify particular updates that are not to be applied to particular types of computing devices. Thus, different update groups can be utilized to indicate update statuses for different computing devices.

In at least some implementations, a computing device can query an update service for available updates. As part of the query, the computing device can provide profile information for the computing device, such as an identifier of a manufacturer for the computing device, a make identifier for the computing device, a model identifier, and so forth. The update service can inspect the profile information, and can match the profile information to a corresponding update group. In at least some implementations, a computing device can be matched to an update group dynamically, e.g., each time the computing device queries for updates.

Update information associated with the corresponding update group can be synchronized with the computing device. For instance, updates associated with the corresponding update group can be propagated to the computing device. Further, in at least some implementations, updates not associated with the corresponding update group (e.g., updates expressly exclude from the group) are not propagated to the computing device.

For instance, consider a scenario where a computing device manufacturer determines that a particular update may interfere with functionality of computing devices that correspond to a particular computing device profile. The update, for example, may cause a software conflict in the computing device that causes undesirable functioning of the computing device. Such undesirable functioning can include a software crash (e.g., an operating system crash), slowing of data processing, component device malfunctioning, and so on. Thus, the computing device manufacturer can specify that the particular update is not to be propagated to the computing devices that correspond to the particular profile. For example, update information for an update group associated with the device profile can indicate that the particular update is not to be installed on computing devices within the update group. This can enable manufacturers that detect problems and/or potential problems with updates to prevent the updates from being installed on computing devices that may be affected.

In the following discussion, an example environment is first described that is operable to employ techniques described herein. Example procedures involving techniques discussed herein are then described which may be employed in the example environment as well as in other environments. Accordingly, the example environments are not limited to performing the example procedures. Likewise, the example procedures are not limited to implementation in the example environment. Finally, an example system and device are described that are operable to employ techniques discussed herein in accordance with one or more embodiments.

Example Environment

FIG. 1 is an illustration of an environment 100 in an example implementation that is operable to employ techniques for computing device update configuration. Environment 100 includes a computing device 102 which can be embodied as any suitable computing device such as, by way of example and not limitation, a desktop computer, a portable computer, a handheld computer such as a personal digital assistant (PDA), mobile phone, tablet computer, and so forth. One of a variety of different examples of a computing device 102 is shown and described below in FIG. 7.

The computing device 102 of FIG. 1 is illustrated as including component devices 104, which are representative of various devices that provide functionality to the computing device 102. Examples of the component devices 104 include a graphics card, a data storage device (e.g., a hard drive), a removable media device, an input/output device, and so forth.

Further included are device drivers 106, which are representative of functionality to enable various entities of the computing device 102 to interact with the component devices 104, and vice-versa. For example, a particular component device 104 can include a corresponding device driver 106, which enables the particular component device 104 to perform various tasks in the context of the computing device 102.

The computing device 102 further includes applications 108, which are representative of functionalities to perform various tasks via the computing device 102. Examples of the applications 108 include a word processing application, a web browsing application, a graphics application, and so forth. Particular of the applications 108 can be installed on the computing device 102, and/or can be implemented as a distributed application, such as a web application.

An update module 110 is provided, which is representative of functionality to manage update operations for the computing device 102. For instance, the update module 110 can determine that an update is available for the device drivers 106 and/or the applications 108. The update module 110 can enable the update to be retrieved (e.g., downloaded from a network resource) and installed on the computing device 102.

Further to embodiments, the computing device 102 is configured to communicate with an update service 112 via a network 114. The update service 112 is representative of functionality to manage updates for groups of computing devices (e.g., including the computing device 102), and to enable the updates to be provided to the computing devices. The update service 112 can be implemented as a network resource, such as via a web server. The network 114 may assume a wide variety of different configurations, such as the Internet, a wide area network (WAN), a local area network (LAN), a wireless network, a public telephone network, an intranet, and so on. Further, although a single network 114 is shown, the network 114 may be configured to include multiple networks.

The update service 112 includes update groups 116, which are representative of groups to which computing devices can be assigned to enable the computing devices to receive appropriate updates. For example, the computing device 102 can be assigned to a particular update group 116 based on various attributes of the computing device 102, as discussed above and below. Updates that are made available to the particular update group 116 can be propagated (e.g., uploaded to and/or downloaded by) the computing device 102.

For instance, a device profile module 118 of the computing device 102 can provide profile information about the computing device 102 to the update service 112. The update service 112 can use the profile information to determine to which of the update groups 116 the computing device 102 is to be assigned. Generally, the device profile module 118 is representative of functionality to maintain information about characteristics of the computing device 102, and to provide the information to various entities.

Examples of such characteristics include identifying characteristics of the computing device 102, such as a manufacturer (e.g., an original equipment manufacturer (OEM,)) for the computing device 102, a make for the computing device 102 (e.g., the brand), a particular model of the computing device 102 (e.g., a model number), and so forth. For example, a particular manufacturer can have multiple makes (e.g., brands) of computing devices. Further, a particular make of computing device can encompass multiple different models.

Characteristics maintained by the device profile module 118 can include a variety of other information, such as identifiers for the component devices 104, identifiers for software and/or firmware installed on the computing device 102 (e.g., the applications 108), and so forth. For instance, the device profile module 118 can access or maintain a system management basic input/output system (SMBIOS) that specifies identification and configuration information for the computing device 102.

Update authorities 120 are further illustrated, which are representative of entities that can issue various types of updates. Examples of the update authorities 120 include device manufacturers (e.g., for the component devices 104), software developers (e.g., for the applications 108), and/or other entities that can develop and/or issue updates for various components and functionalities. For example, the update authorities 120 can generate driver updates 122, which are representative of drivers that can be used to update the device drivers 106. The update authorities 120 can also generate software updates 124, which are representative of updates for the applications 108 and/or other software.

In implementations, the update authorities 120 can provide various updates to the computing device 102 via the update service 112. For instance, a particular update can be propagated from one of the update authorities 120 to the update service 112. The update service 112 can associate the update with a particular update group 116. Thus, the update can be provided by the update service 112 to computing devices (e.g., the computing device 102) that are associated with the particular update group 116. Alternatively or additionally, the update service 112 can coordinate propagation of an update (e.g., via upload and/or download) directly from an update authority 120 to the computing device 102. Thus, the update service 112 can store drivers and/or updates locally on the service for propagation to various computing devices, and/or the update service 112 can serve as a broker for enabling appropriate updates to be propagated to various computing devices, e.g., directly from the update authorities 120.

Further illustrated are computing device authorities 126, which are representative of entities that can make various update decisions for computing devices. For example, the computing device authorities 126 can include an OEM for the computing device 102. The computing device authorities 126 maintain update targeting information 128, which specifies update information and statuses for particular classes and/or categories of computing devices. For instance, the computing device authority 126 can generate update targeting information 128 that specifies that computing devices that meet a particular profile (e.g., manufacturer, make, model, component device profile, and so on) are to receive particular updates, and/or are not to receive other updates. Thus, the computing device authorities 126 can tailor the update targeting information 128 to specify custom update configurations for various types and/or classifications of computing devices.

The computing device authorities 126 can provide the update targeting information 128 to the update service 112. The update service 112 can use the update targeting information 128 to configure the update groups 116 to correspond to the update targeting information 128. Thus, a particular update group 116 can reflect update information (e.g., driver profiles, software update profiles, and so forth) specified for particular computing devices by the update targeting information 128. In implementations, this can enable the computing device authority 126, such as a computing device manufacturer, to specify custom collections of updates that are to be provided to computing devices that meet particular device profiles.

Figure 2:
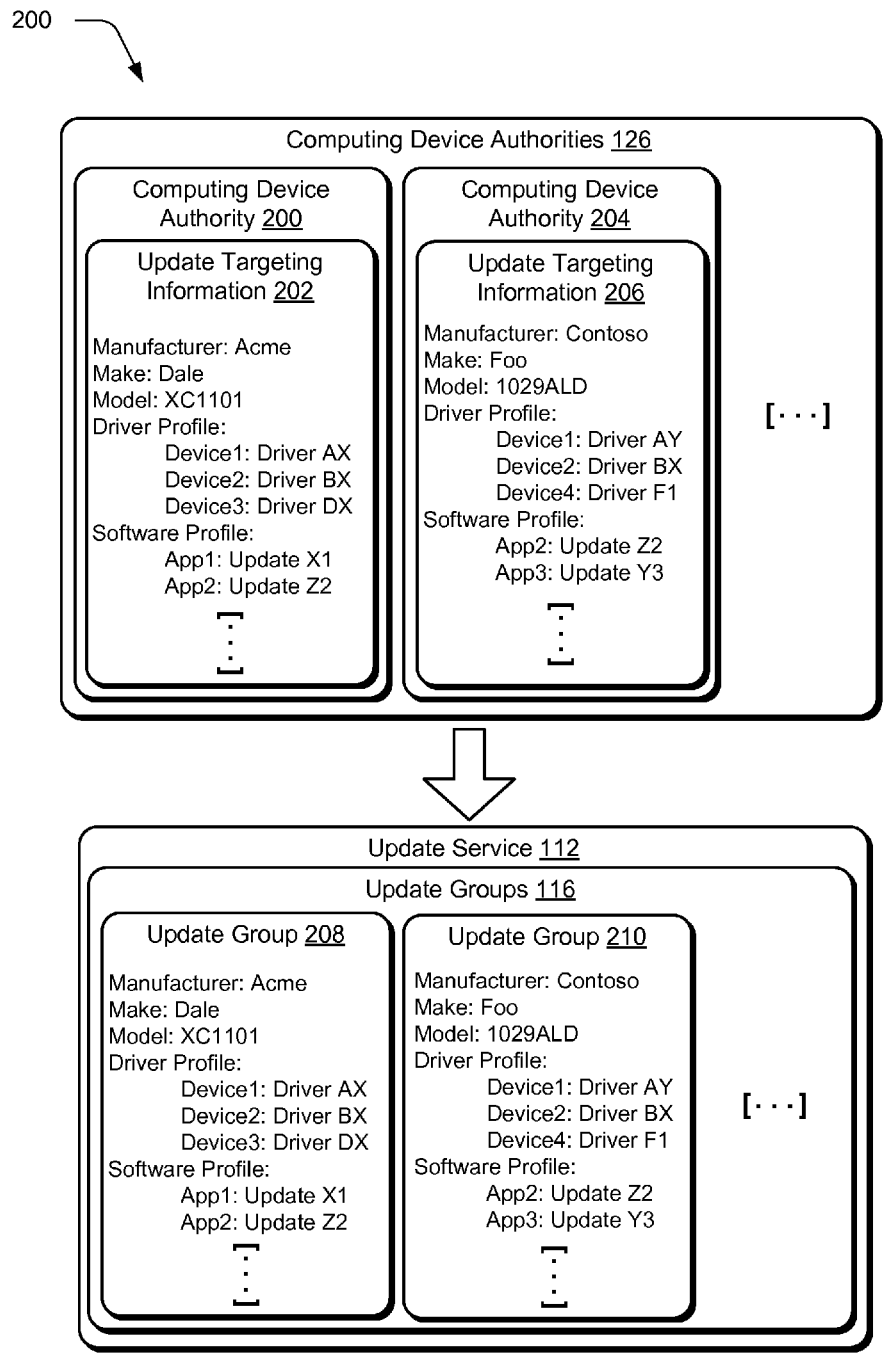
FIG. 2 illustrates an example implementation scenario in accordance with one or more embodiments.

FIG. 2 illustrates an example scenario of a mapping of update targeting information to the update groups 116, generally at 200. In the upper portion, a computing device authority 200 specifies update targeting information 202. For example, the computing device authority 200 is the manufacturer "Acme," which manufactures several models of a "Dale" computer, including the model "XC1101." For this particular device profile, the update targeting information 202 specifies particular mappings of component devices to device driver versions, e.g., Device1 corresponds to a Driver version AX, and so forth. The update targeting information 202 further includes software profiles, such as updates that are to be applied to particular applications. For example, an update X1 is to be applied to an application "App1," and so forth.

Further included is a computing device authority 204, which specifies update targeting information 206. For example, the computing device authority 204 is associated with a manufacturer "Contoso," which manufactures a computing device "Foo" and model "1029ALD." The update targeting information further specifies driver versions for various component devices of the "Foo 1029ALD," as well as software update versions.

Continuing to the lower portion of the scenario 200, the update targeting information 202, 206 is propagated to the update service 112. The update service 112 processes the update targeting information 202, 206, and generates and/or updates an update group 208 and an update group 210 based on the update targeting information 202, 206. For example, the update group 208 corresponds to the update targeting information 202, and the update group 210 corresponds to the update targeting information 206. Thus, the update groups 208, 210 can be used to determine which drivers and/or software updates are to be propagated to computing devices whose profiles match particular update groups. For instance, an Acme Dale XC1101 computing device can receive drivers and/or updates indicated by the update group 208, and a Contoso Foo 1029ALD can receive drivers and/or updates indicated by the update group 210.

While embodiments are discussed herein with reference to receiving updated drivers and/or software updates, embodiments may also be employed to prevent driver updates and/or software updates from being propagated to particular computing devices. For instance, the computing device authority 126 can determine that a particular update may cause compatibility issues and/or prevent optimal functioning of a particular category of computing devices. Thus, the computing device authority 126 can configure the update targeting information 128 to indicate that a previous version of the driver and/or software is to be utilized for the particular category of computing devices, and not an updated version. Based on this update targeting information 128, the update service 112 can configure a particular update group 116 that corresponds to the particular category of computing devices to exclude the updated version. Thus, in at least some implementations, a computing device that receives updates via the particular update group 116 will not receive the updated version, e.g., in response to a query to the update service 112 for updates.

The update targeting information and update groups discussed above are presented as examples, and a wide variety of different types and configurations of update targeting information and update groups can be implemented within the spirit and scope of the claimed embodiments. For instance, update targeting information and update groups can include different profile information, computing device configurations, and data fields than those expressly illustrated in the example embodiments discussed above.

Having described an example environment in which the techniques described herein may operate, consider now a discussion of some example procedures in accordance with one or more embodiments.

Example Procedures

The following discussion describes example procedures for computing device update configuration in accordance with one or more embodiments. In portions of the following discussion, reference will be made to the environment 100 of FIG. 1.

Figure 3:
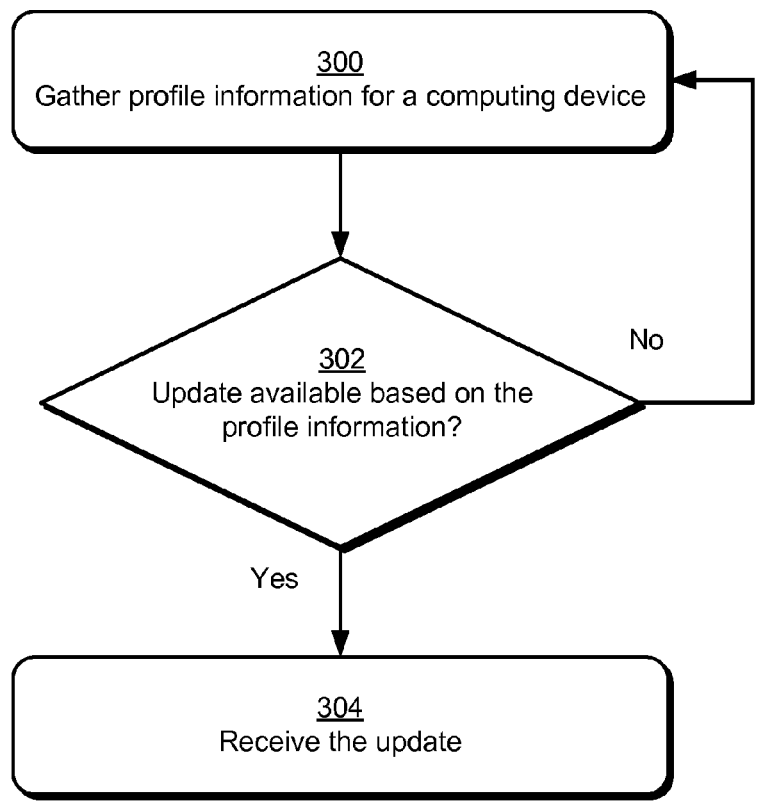
FIG. 3 is a flow diagram that describes steps in a method in accordance with one or more embodiments.

FIG. 3 is a flow diagram that describes steps in a method in accordance with one or more embodiments. Step 300 gathers profile information for a computing device. For instance, the update module 110 can query the device profile module 118 for profile information for the computing device 102. As referenced above, the profile information can include a manufacturer, make, and/or model of a computing device. The profile information can also include other information, such as identifiers for the component devices 104, identifiers for the applications 108, identifiers for other functionalities of the computing device 102 (e.g., a firmware version), and so on.

Step 302 queries for an update based on the profile information. The update module 110, for instance, can query the update service 112 for updates to device drivers, software, and so forth. As part of this query, the update module 110 provides the profile information to the update service 112, which can determine whether updates are available for the computing device 102 based on the profile information. The profile information, for instance, can be provided as a set of identifiers that can be translated by the update service 112 to ascertain profile information for the computing device 102.

If an update is available ("Yes"), step 304 receives the update. For example, the update can be downloaded to the computing device 102 from the update service 112 and/or the update authority 120. The update can be installed on the computing device.

If an update is not available ("No"), the process can return to step 300. For example, the computing device 102 can be configured to query the update service 112 for updates on a periodic basis, such as daily, weekly, and so forth.

Figure 4:
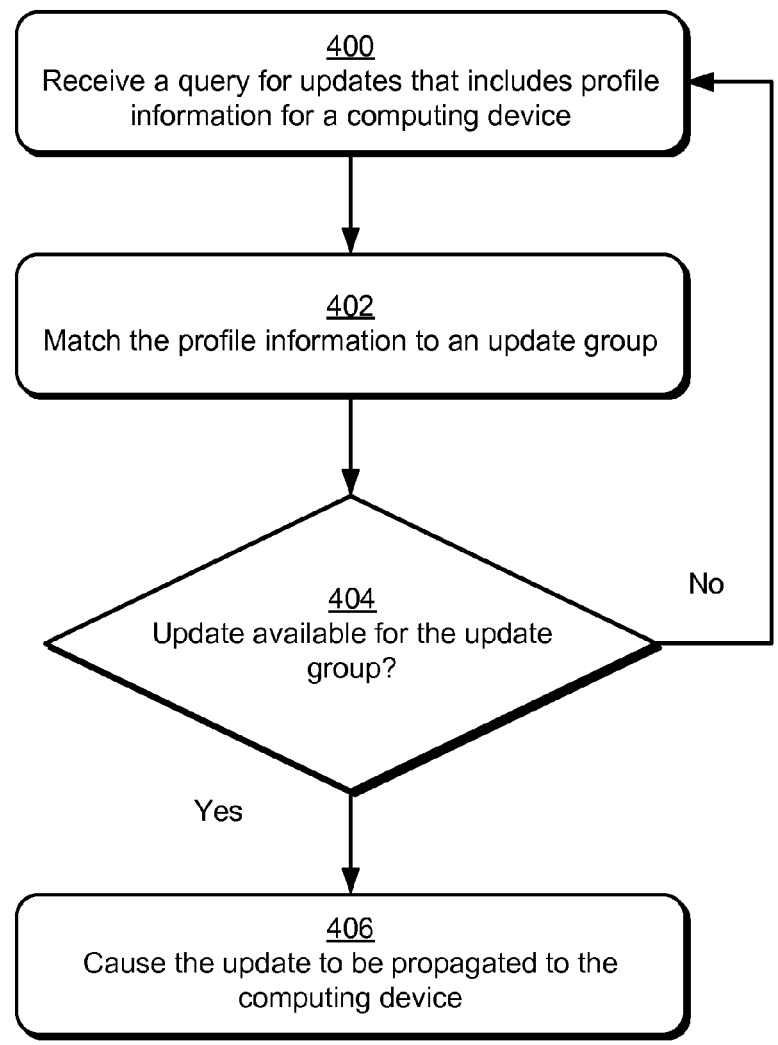
FIG. 4 is a flow diagram that describes steps in a method in accordance with one or more embodiments.

FIG. 4 is a flow diagram that describes steps in a method in accordance with one or more embodiments. Step 400 receives a query for updates that includes profile information for a computing device. The update service 112, for instance, can receive a query from the update module 110 asking whether updates to various functionalities of the computing device 102 are available. The query can include profile information for the computing device 102, such as a manufacturer, make, model, and so forth.

Step 402 matches the profile information to an update group. For example, a manufacturer, make, and/or model indicated by the profile information can be matched to one of the update groups 116 that specifies the same manufacturer, make, and/or model. Other profile information can be considered as well, such as component device identifiers, software identifiers, firmware identifiers, basic input/output system (BIOS) identifiers, and so forth.

In at least some implementations, a computing device that queries for update information can be dynamically matched to an update group. For instance, each time a particular computing device provides profile information as part of a query for updates, the profile information can be dynamically inspected and matched to a particular update group.

Step 404 ascertains whether an update is available for the update group. The update service 112, for instance, can ascertain that an update has been made available to the update group subsequent to a previous update session between the update service and the computing device 102.

If an update is available ("Yes"), step 406 causes the update to be propagated to the computing device. The update, for instance, can be downloaded to the computing device 102 from the update service 112 and/or one of the update authorities 120.

If an update is not available ("No"), the process returns to step 400. As referenced above, a computing device can be configured to periodically query for updates.

In implementations, a computing device can be dynamically reassigned to a different update group 116 based on various factors. For example, a change in a computing device profile (e.g., hardware, software, firmware, and so forth) can cause a computing device to be reassigned to a different update group.

Alternatively or additionally, a change in update group configuration can cause a computing device to be reassigned to a different update group. For example, consider a scenario where a computing device authority 126 changes the update targeting information 128. For instance, changes in computing device profile information associated with particular updates can be changed in the update targeting information. The changes in the update targeting information 128 can be propagated to the update service 112, which can make corresponding changes to the update groups 116. Thus, when a computing device affected by the changes in the device profile information queries for updates, the computing device may be reassigned to a different update group 116.

Figure 5:
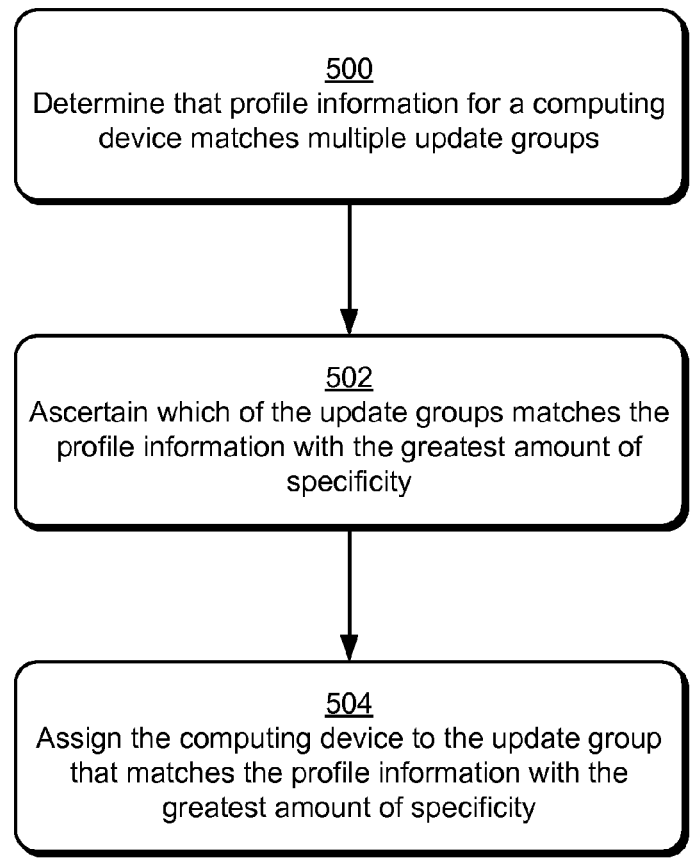
FIG. 5 is a flow diagram that describes steps in a method in accordance with one or more embodiments.

FIG. 5 is a flow diagram that describes steps in a method in accordance with one or more embodiments. In at least some embodiments, the method describes an example way of assigning a computing device to an update group, such as discussed above with reference to step 402 of FIG. 4.

Step 500 determines that profile information for a computing device matches multiple update groups. For instance, multiple update groups may be associated with the same manufacturer, make, and/or model of computing device indicated in the profile information.

Step 502 ascertains which of the update groups matches the profile information with the greatest amount of specificity. For instance, one update group may be associated with a particular manufacturer, make, and/or model of computing device. Another update group may also be associated with the same manufacturer, make, and/or model, but may also match additional information indicated in the profile information, such as a component device identifier, a software identifier, and so forth. In at least some implementations, profile information can be matched to data fields of update groups to determine degrees of correspondence, e.g., the greatest number of data fields to which the profile information corresponds.

Step 504 assigns the computing device to the update group that matches the profile information with the greatest amount of specificity. The computing device, for instance, can be assigned to the update group with the highest level of information correspondence (e.g., data field matching) with the profile information. As discussed above, the update group can be used to determine whether updates are available for the computing device.

Figure 6:
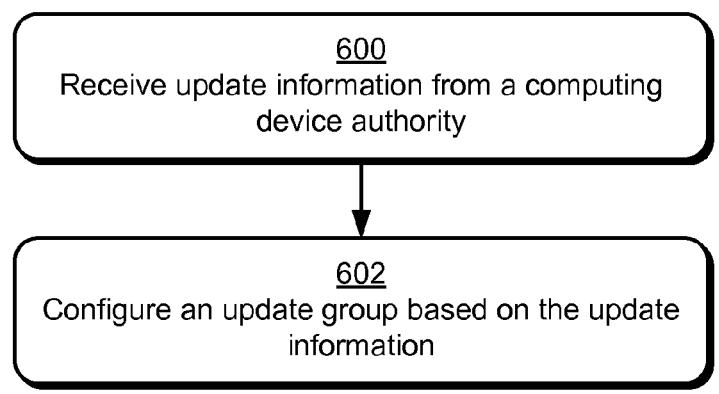
FIG. 6 is a flow diagram that describes steps in a method in accordance with one or more embodiments.

FIG. 6 is a flow diagram that describes steps in a method in accordance with one or more embodiments. Step 600 receives update information from a computing device authority. The update service 112, for instance, can receive the update targeting information 128 from one of the computing device authorities 126. As referenced above, the computing device authorities 126 can include a computing device manufacturer, such as an OEM for a computing device. The computing device authorities 126 may also include an entity authorized by a computing device manufacturer to configure and/or make decisions concerning update information, such as via configuration of the update targeting information 128.

Step 602 configures an update group based on the update information. For example, the update service 112 can make changes to an update group 116 based on the update targeting information 128. Alternatively or additionally, the update service 112 can create a new update group 116 based on the update targeting information 128. Thus, implementations can enable update groups to be dynamically reconfigured and/or created, such as in response to update information received from a computing device manufacturer.

In at least some implementations, the update service 112 can include default update settings and/or pre-specified update groups 116. A default update setting, for instance, can specify that updates are to be provided to a computing device when available. Thus, in implementations the update targeting information 128 can be used to override default update settings. The update targeting information 128 may also be employed to replace and/or augment existing update groups 116, such as update groups 116 originated by the update service 112 or other entity.

In at least some implementations, the update targeting information 128 can be used to exclude certain available updates from the update groups 116. As referenced above, certain updates that become available can be determined to cause undesirable functioning of computing devices that match a particular profile, such as software conflicts, reduction in device functionality, and so forth. To prevent such updates from being propagated to these computing devices, a computing device authority 126 can specify via the update targeting information 128 that an available update is not to be provided to computing devices that match a particular configuration profile. The particular configuration profile, for instance, can be associated with a specific update group 116. Thus, even though the update is available (e.g., a driver update, a software update, and so forth), the update service 112 can indicate that the update is not to be propagated to computing devices that match the particular profile. The update service 112, for instance, can override update settings that specify that updates are to be provided when available. Such update settings can be associated with the computing device 102 (e.g., the update module 110), the update service 112, the update authorities 120, and so forth. This can enable the update service 112 to prevent updates from being propagated to the computing device 102 based on various information, such as the update targeting information 128 from the computing device authorities 126.

Having discussed some example procedures, consider now a discussion of an example system and device in accordance with one or more embodiments.

Example System and Device

Figure 7:
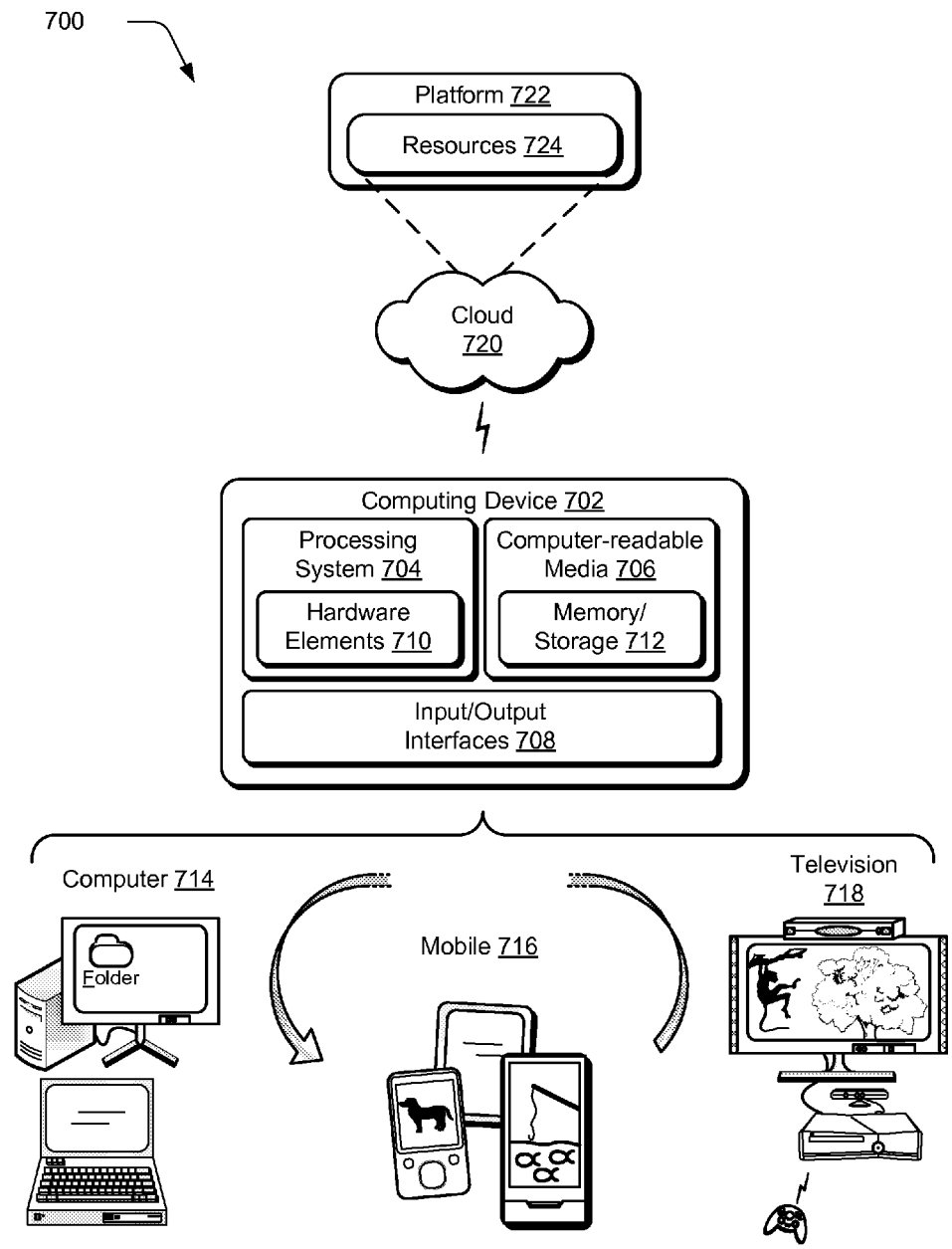
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement various techniques described herein. For example, the computing device 102 discussed above with reference to FIG. 1 can be embodied as the computing device 702. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media does not include signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as an module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, functionalities discussed with reference to the computing device 102 and/or the update service 112 may be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for computing device update configuration are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   receiving update information from a computing device manufacturer, the update information including an update configuration for a computing device; and
   configuring, based on the update information, an update group that specifies particular update statuses for functionalities of the computing device and is associated with the computing device.

2. A method as described in claim 1, wherein the update information comprises at least one of device driver information or software update information for the computing device.

3. A method as described in claim 1, wherein the update information comprises one or more of an identifier of the computing device manufacturer, a make identifier for the computing device, or a model identifier for the computing device.

4. A method as described in claim 1, wherein the update group comprises a pre-existing update group, and wherein said configuring comprises dynamically changing the update group based on the update information.

5. A method as described in claim 1, wherein the update information comprises an indication of at least one update that is not to be propagated to the computing device.

6. A method as described in claim 1, wherein the update information comprises an indication that a previous version of a device driver is to be utilized by the computing device, instead of an updated version.

7. A method as described in claim 1, further comprising:
   receiving an update query from the computing device, the update query including profile information that identifies at least the computing device manufacturer; and
   matching the computing device to the update group based on the profile information such that the computing device is configurable based on the update configuration.

8. A method as described in claim 7, wherein said matching comprises:
   determining that the profile information matches multiple different update groups, including the update group; and
   assigning the computing device to the update group based on ascertaining that, of the multiple update groups, the update group matches the profile information with the greatest amount of specificity.

9. A system comprising:
   one or more processors; and
   at least one memory storing computer readable instructions that are executable by the one or more processors to perform operations including:
   receiving update targeting information from a computing device authority, and configuring one or more update groups based on the update targeting information, individual of the update groups specifying one or more particular update statuses for functionalities of one or more computing devices;
   receiving an update query that includes profile information for a different computing device, the profile information specifying at least a manufacturer of the different computing device; and
   assigning the different computing device to at least one of the update groups based on matching the profile information to the at least one update group such that the update targeting information is applied to the different computing device.

10. A system as recited in claim 9, wherein the update targeting information comprises a device driver profile for one or more types of computing devices associated with the computing device authority.

11. A system as recited in claim 9, wherein the computing device authority comprises an original equipment manufacturer.

12. A system as recited in claim 9, wherein the profile information includes a make identifier and a model identifier for the different computing device.

13. A system as recited in claim 9, wherein the operations further comprise assigning the different computing device to the at least one of the update groups by:
   determining that the profile information matches multiple of the update groups; and
   assigning the different computing device to the at least one of the update groups in response to ascertaining that the at least one of the update groups matches the profile information with greater specificity than other of the update groups.

14. A system as recited in claim 9, wherein the operations further comprise dynamically reconfiguring the one or more update groups based on additional update targeting information received from the computing device authority.

15. A system as recited in claim 9, wherein the operations further comprise overriding at least one update setting for the different computing device such that one or more available updates are not propagated to the different computing device.

16. A system as recited in claim 9, wherein the operations further comprise dynamically reassigning the different computing device to a different update group based on a change in at least one of the update targeting information, or the different computing device.

17. A computer-implemented method, comprising:
   gathering profile information for a computing device, the profile information indicating at least a manufacturer and a model of the computing device;
   querying, by the computing device, an update service with the profile information to ascertain whether an update is available for the computing device; and
   receiving, responsive to said querying, one or more updates for one or more functionalities of the computing device.

18. A computer-implemented method as described in claim 17, wherein the profile information further includes one or more identifiers for component devices of the computing device.

19. A computer-implemented method as described in claim 17, wherein the profile information is gathered from a system management basic input/output (SMBIOS) of the computing device.

20. A computer-implemented method as described in claim 17, wherein the profile information further includes one or more identifiers for software installed on the computing device.

* * * * *